J. A. SHEARER.
SPRING SUSPENSION GEAR FOR MOTOR CARS AND OTHER VEHICLES.
APPLICATION FILED APR. 30, 1915.

1,160,775.

Patented Nov. 16, 1915.

INVENTOR
John Alexander Shearer
BY
ATTORNEYS

UNITED STATES PATENT OFFICE.

JOHN ALEXANDER SHEARER, OF PROSPECT, SOUTH AUSTRALIA, AUSTRALIA.

SPRING SUSPENSION-GEAR FOR MOTOR-CARS AND OTHER VEHICLES.

1,160,775.  Specification of Letters Patent.  Patented Nov. 16, 1915.

Application filed April 30, 1915. Serial No. 24,890.

*To all whom it may concern:*

Be it known that I, JOHN ALEXANDER SHEARER, blacksmith, a subject of the King of Great Britain and Ireland, residing at Methuen street, Prospect, but formerly of Glen Osmond road, Parkside, State of South Australia, Commonwealth of Australia, have invented a certain new and useful Improvement in Spring Suspension-Gear for Motor-Cars and other Vehicles, of which the following is a specification.

This invention relates to the suspension or mounting of the frame of a motor car or other vehicle upon its axles by means of links connected with each axle and pivoted to said frame and adapted to be moved against the action of a spring or springs, when said axle rises relatively to the frame, so as to absorb the shock or jar caused by the passage over rough roads or over irregularities or obstacles as described more particularly in my United States Patent Number 1129744, dated February 23, 1915, and the object of this present invention is to provide an improved construction of this nature which will still more effectually prevent the transmission of the shock or jar to the frame of the car or vehicle.

According to the beforementioned patent each end of each axle is attached to the pivotally connected adjacent inner ends of two longitudinal and approximately horizontal links, one in front and one behind, which are pivotally connected to the frame of the car or vehicle and provided with a lever and spring connection which tends to keep the links as nearly as possible in a straight line and to restore them thereto after displacement. According to this present invention one of each pair of the aforesaid links is extended beyond its pivotal connection to the frame of the car or vehicle and such extended end is connected to the frame by a spring the tendency of which is to raise the extended end and press down the pivotally connected adjacent inner ends of the links and the attached axle, thereby neutralizing a portion of the tendency of the wheel to lift that end. This spring connection may be a flat laminated spring the end of which is connected to the link by a hanger, or it may be a spiral spring connected at one end to the frame and at the other to the link. In the case of a car or vehicle having front and rear axles the one laminated spring may have its two ends connected by hangers to the extended links of the front and rear axles.

In order that my invention may be clearly understood I will describe the same with reference to the accompanying drawings in which:—

Figure 1:
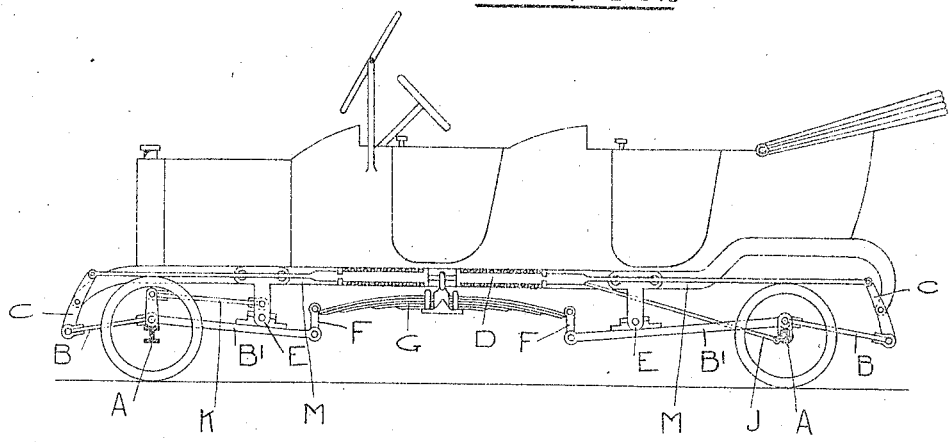
Figure 2:
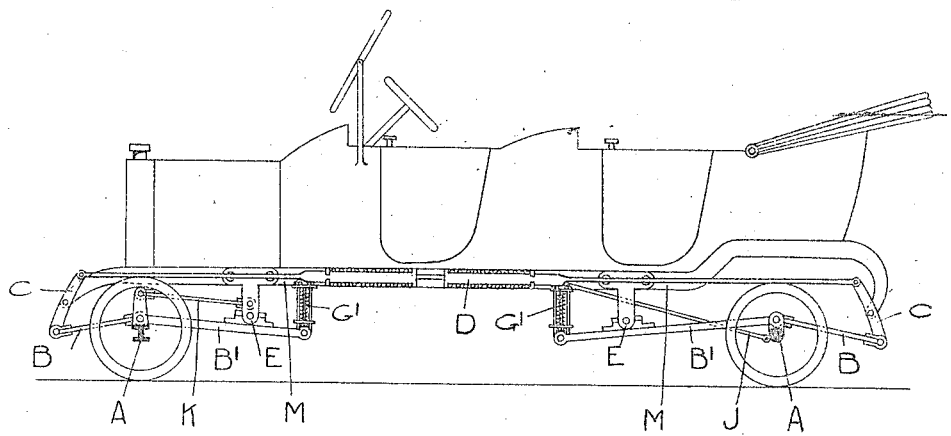

Figure 1 is a side view of a motor car with my invention applied thereto the ends of the extended links being connected by hangers to the two ends of the one laminated spring. Fig. 2 is a similar view but showing the ends of the extended links connected to two independent spiral springs.

As will be seen from the drawings each of the axles A is attached to the pivotally connected adjacent inner ends of two approximately horizontal links B and B¹. The links B¹ B¹ of the front and rear axles are pivoted to brackets E E secured to and depending downward from the frame M, the front link being pivoted near its rear end and the rear link near its front end. The links B B of the front and rear axles have their outer ends pivotally attached to the lower ends of two approximately vertical levers C C, the levers being pivoted at about their centers to the ends of the frame M, and the upper ends of the levers C C being connected together by rods and a spring connection D tending to draw them together. As shown in Fig. 1 the extended ends of the links B¹ B¹ are connected by hangers F F to the two ends of the laminated spring G which is secured to the frame M, the tendency of the spring G being to lift the extended ends of the links. As shown in Fig. 2 the extended ends of the links B¹ B¹ are connected to two independent spiral springs G¹ G¹ which tend to lift the extended ends of the links.

The rear axle is prevented from rocking backward or forward by means of rods J as is common practice, and the front axle is prevented from rocking backward or forward by means of supplementary links K as described in my aforesaid prior application.

According to this construction the spring D is materially assisted in its work by the spring G or the springs G¹ G¹ acting through the extended ends of the links B¹ B¹, and the movements of the wheels and axles in accommodating themselves to inequalities in the road are absorbed by the combination of links, levers and springs without being transmitted to the frame of the car or vehicle.

What I claim is—

1. An improved suspension device for motor cars and other vehicles comprising, near each end of each axle, two longitudinal and approximately horizontal links the adjacent inner ends of which are pivotally connected together and to the axle, the rear link of the front axle and the front link of the rear axle being pivotally attached near their respective outer ends to brackets secured to and depending downward from the frame of the car or vehicle and their extreme outer ends, which extend beyond such pivot, being connected by a spring connection to the said frame and tending to raise said extended ends, and the outer ends of the front link of the front axle and of the rear link of the rear axle being pivotally attached to the lower ends of two approximately vertical levers pivoted at about their center to the said frame, and the upper ends of the two levers being connected together by a spring or springs tending to maintain the links in a horizontal position, substantially as described.

2. In an improved suspension device for motor cars and other vehicles, two approximately horizontal links near each end of each axle, the links having pivotally connected ends to which the adjacent end of an axle is attached, the said links extending respectively inwardly and outwardly from the axles, means connected with the free ends of the outwardly extending links for supporting the links and tending to maintain the same in a horizontal position, the inwardly extending links at each end of each axle being pivotally attached to the frame of the vehicle and each having its end extended beyond its point of attachment, and a lifting spring connecting the said extended end to the frame of the vehicle and tending to raise the said extended end and press down the pivotally connected ends of the links and the attached axle.

In testimony that I claim the foregoing as my invention I have signed my name in the presence of two subscribing witnesses this 22nd day of March 1915.

JOHN ALEXANDER SHEARER.

Witnesses:
ARTHUR GORE COLLISON,
LESLIE HERBERT BROADBENT.